F. C. GORDON.
FRUIT GRADING MACHINE.
APPLICATION FILED FEB. 26, 1918.
1,282,069.
Patented Oct. 22, 1918.
2 SHEETS—SHEET 2.
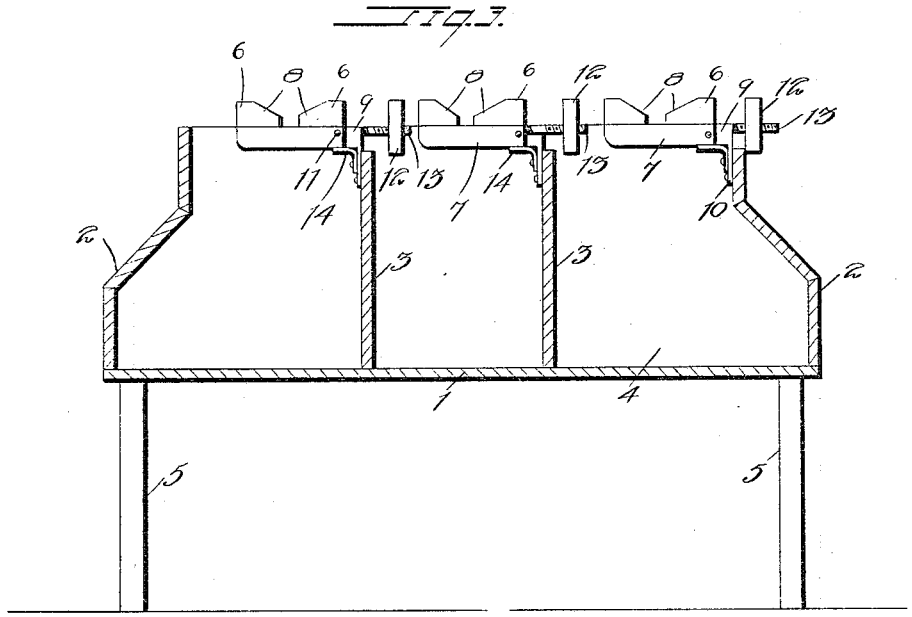
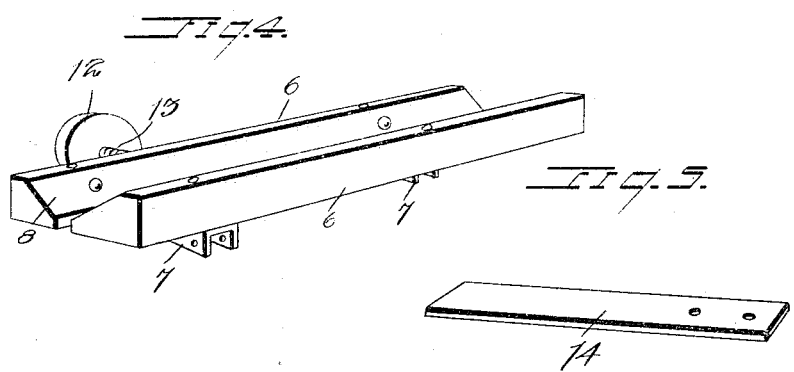
WITNESSES
INVENTOR
FYNIS. C. GORDON,
BY
ATTORNEYS

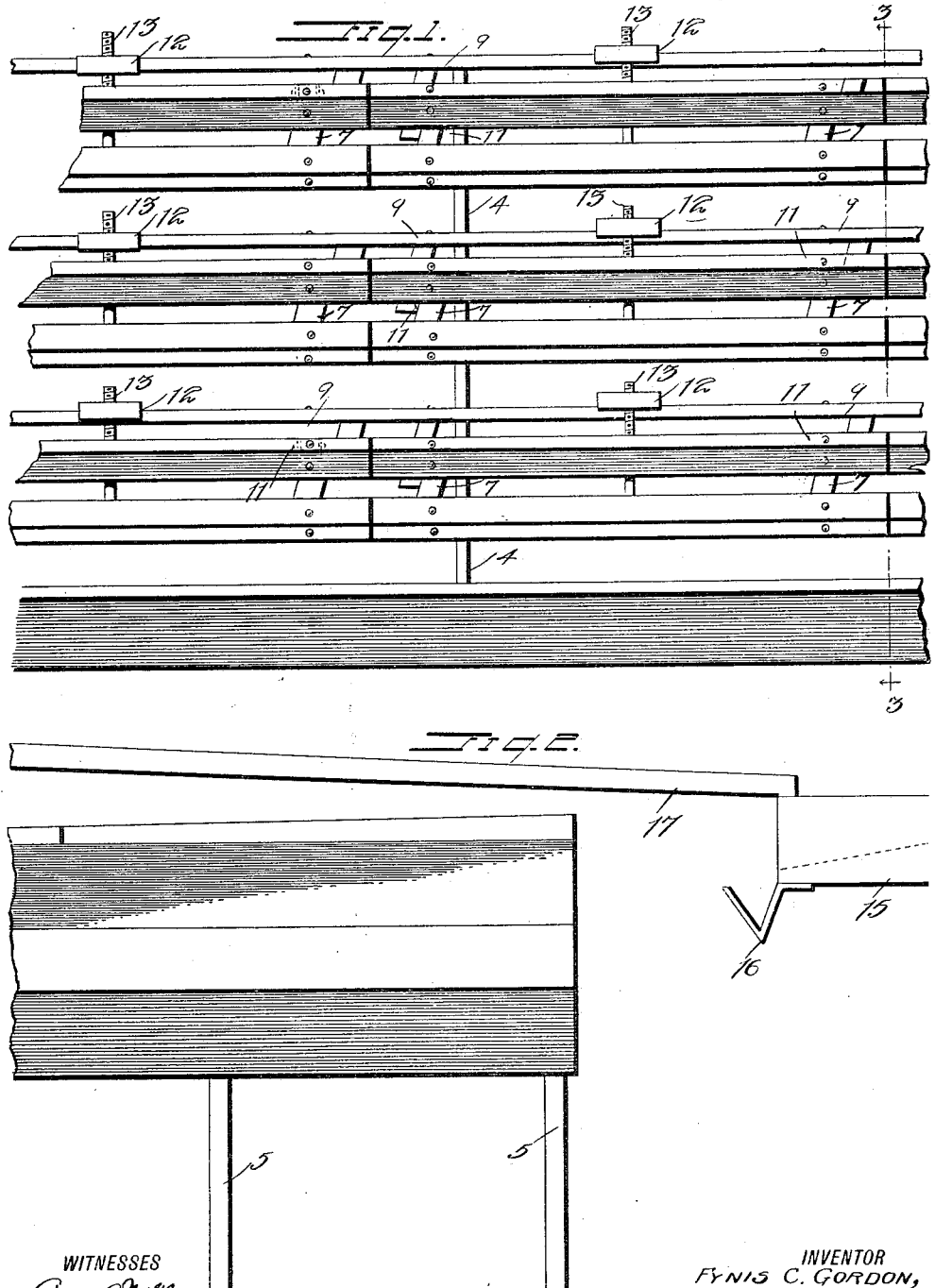

UNITED STATES PATENT OFFICE.

FYNIS C. GORDON, OF WENATCHEE, WASHINGTON.

FRUIT-GRADING MACHINE.

1,282,069.

Specification of Letters Patent.  Patented Oct. 22, 1918.

Application filed February 26, 1918.  Serial No. 219,306.

*To all whom it may concern:*

Be it known that I, FYNIS C. GORDON, a citizen of the United States, and a resident of Wenatchee, in the county of Chelan and State of Washington, have invented certain new and useful Improvements in Fruit-Grading Machines, of which the following is a specification.

My invention is an improvement in fruit grading machines, and has for its object to provide a device of the character specified, wherein a series of runways is provided for the fruit, each runway consisting of a series of tiltable sections, counterweighted to yield under the weight of a fruit of a certain predetermined size, the device having bins for receiving the fruit, and having means for quickly returning the tilting sections of the raceway to normal position, and wherein the counterweights are adjustable.

In the drawings:

Figure 1 is a partial top plan view of the improved grader;

Fig. 2 is a partial side view;

Fig. 3 is a section on the line 3—3 of Fig. 1;

Fig. 4 is a perspective view of one of the tilting sections;

Fig. 5 is a perspective view of one of the springs.

In the present embodiment of the invention, a suitable supporting casing is provided, the said casing consisting in the present instance of a bottom 1, side walls 2 and partition walls 3, extending longitudinally of the casing, and transverse partition walls 4, the said walls 3 and 4 dividing the casing into a series of bins.

In practice, the casing will be divided into twenty-four bins, that is, three longitudinally extending rows or series of eight each. The casing is supported by suitable legs 5, and at its top the casing is open, all the compartments being open, as shown in Figs. 1 and 3.

A series of tilting grading troughs is connected with one of the side walls 2 and with the partition walls 3, a tilting trough being arranged at each compartment, above the same, and since all the troughs are similar, but one will described.

As shown in Fig. 4, each trough consists of two rigidly connected spaced parallel side bars 6, the said bars of each trough being connected by transversely arranged channel plates 7, each of which is one leaf of a hinge, to be described. The inner upper corners of the bars 6 are beveled, as shown at 8, to provide a runway for the fruit, and the troughs of each series are arranged in alinement as shown in Fig. 1, so that continuous runways are formed for the fruit from the feed to the delivery end of the casing, three of the said runways being provided in the present instance.

The other leaf of each hinge consists of a body 9 formed of a channel plate having at one end a lateral extension 10. The extension 10 of each hinge leaf is secured to the side wall 2 or to one of the partitions 3, and the body portion is pivotally connected to the adjacent hinge leaf 7, as indicated at 11. The channels of the hinge leaves 7 are wider than the channels of the bodies 9 of the coöperating hinge leaves, and the said bodies 9 of the coöperating hinge leaves are received between the side walls of the bodies of the leaves.

Referring more particularly to Fig. 1, it will be noticed that the pintles or pivotal connections 11 of the two hinges of each tilting section are not in alinement, one being at approximately the center of the trough section while the other is near the outer side of the adjacent side bar. In effect, one pintle is at the inner side of one side bar, while the other pintle is at the outer side. Thus when the tilting sections tilt, that end at the right of Fig. 1 will drop lower than the end toward the left of Fig. 1, imparting to the tilting section an irregular motion which will tend to quickly discharge the fruit from the section.

Each tilting section is counterbalanced by a counterweight 12 which is adjustably mounted upon a stem 13 extending outwardly from the section at that side adjacent to the outermost hinge pintle. In the present instance, the counterweights 12 are threaded onto the stems, and they may be adjusted thus to counterbalance any size or weight fruit. In order to insure a quick return of the tilting sections, each is engaged by one end of a plate spring 14, the other end of the spring being secured to the lateral extension 10 of the adjacent hinge 11.

At the feed end of the machine, the counterweights are arranged to yield under the weight of the largest size fruit, and each succeeding tilting section is arranged to yield under the weight of a lighter weight fruit, and the runways are arranged at an incline of about one and a half inches to the foot, that it, just sufficiently to cause the fruit to travel or roll through the series. The pintles of the hinges are made removable in order that any section may be removed when desired, for any purpose.

In operation, the fruit to be graded is fed from a suitable bin 15 having an inclined bottom, as indicated by the dotted lines in Fig. 2, which causes the fruit to roll into a substantially V-shaped trough 16 secured to the delivery end of the bin. From this trough the fruit is removed by the grader and placed in the first tilting section of the runway adjacent to which he stands. As the fruit rolls down the runway and reaches that section of the runway which is counterweighted to tilt under the size of the particular specimen of fruit, the section will tilt and the fruit will be tilted out into the bin below. The small unfit fruit will be passed out at the lower or delivery end of the grader, and each bin will contain its particular grade of fruit. Should, for any reason, any of the fruit be overlooked by the sorters, an inclined return race 17 is provided for returning the fruit to the bin, the said chute extending along one side of the casing. The peculiar arrangement of the hinges for the tilting sections provides for a very quick discharge, the inlet end of the race being lifted at one side above the general level of the race, while the outlet end of the race is depressed below the general level of the race. Thus a stop will be provided at the inlet end of the race for checking the motion of any of the fruit that may be in the race.

The hinge leaves, in practice, will be formed of angle material, and the peculiar arrangement of the hinges, having their pintles in alinement but inclined with respect to the long axis of the tilting sections, changes the grade of inclination as the sections tilt.

I claim:

1. A machine of the character specified, comprising a race or runway composed of spaced side bars rigidly connected, said runway being sectional, and each section being mounted to tilt, a counterweight adjustably connected with each section for determining the weight under which the section will tilt, each section being hinged at one side and the pintles of the hinges being in alinement, but inclined with respect to the length of the sections, the pintle of the hinge at the delivery end of the section being near the support of the section.

2. A machine of the character specified, comprising a race or runway composed of spaced side bars rigidly connected, said runway being sectional, and each section being mounted to tilt, a counterweight adjustably connected with each section for determining the weight under which the section will tilt, and a spring for returning each section.

3. A machine of the character specified, comprising an inclined sectional runway for the fruit, each section of the runway being hinged to tilt to discharge the fruit at the section, a counterweight adjustably connected with each section for determining the weight under which the section will tilt, said sections being hinged, and the pintles of the hinges being in alinement and in a line inclined with respect to the length of the section, the pintle at the low end of the section being near the support for the section.

4. In a machine of the character specified, an oscillating trough for grading the fruit, each trough being hinged to swing upon an axis inclined with respect to the length of the trough, the trough being counterweighted to swing under a predetermined weight, and the trough being inclined downwardly toward that end which swings the lowest when the trough is tilted.

FYNIS C. GORDON.

Witnesses:
N. A. PEARSON,
FLORANCE GROVER.